Feb. 8, 1944.  C. L. AUSTIN  2,341,072
ANIMAL WEANER
Filed June 23, 194
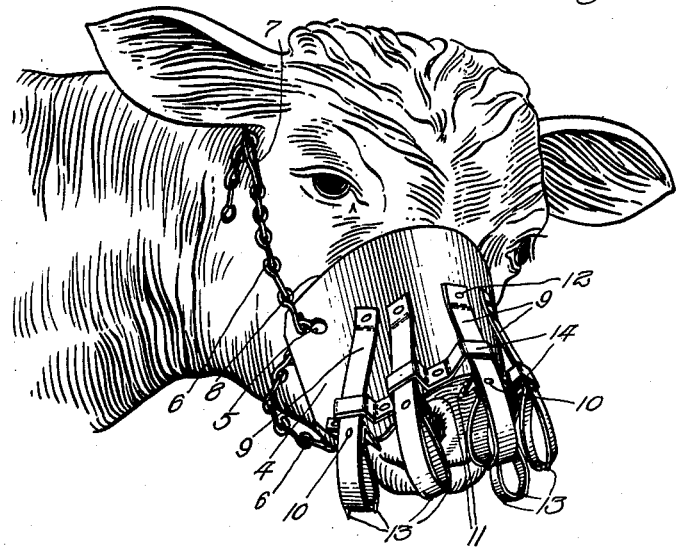
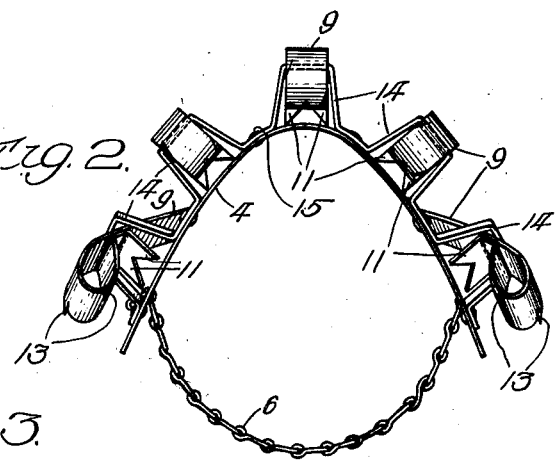
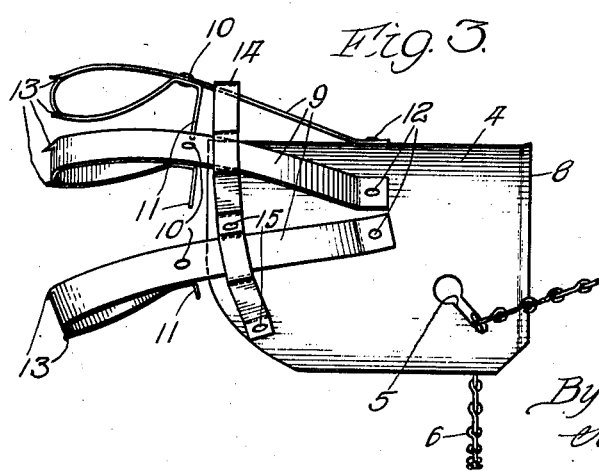
Inventor:
Clarence L. Austin,

UNITED STATES PATENT OFFICE 2,341,072

ANIMAL WEANER

Clarence L. Austin, Round Grove, Ill.

Application June 23, 1943, Serial No. 491,885

5 Claims. (Cl. 119—130)

This invention relates to a weaner adapted for use on calves or cows and designed to prevent them from sucking another cow.

The primary object of the invention is to provide a humane device which will jab the nose of the animal attempting to do the sucking. A further object of the invention is to provide a weaner which will inflict punishment primarily on the animal attempting to do the sucking but will also hurt, but to a lesser degree, the animal to be suckled.

The invention is illustrated in the preferred embodiment in the accompanying drawing, in which—

Figure 1 is a perspective view showing the weaner attached to the nose of an animal; Figure 2, a bottom plan view of the weaner; and Figure 3, a side elevational view of the same.

In the embodiment illustrated, a muzzle piece 4, preferably of about 20 gauge sheet metal is curved to fit over the nose of an animal. The metal, although fairly rigid, may readily be bent by hand to fit the nose of a particular animal comfortably. The muzzle is provided with keyhole shaped slots 5 to receive adjustably a chain 6 which passes loosely under the jaw of the animal, to permit grazing, while the outer ends are drawn around the animal's head, back of its ears, and are adjustably held by a snap fastener 7. Preferably the upper end of the muzzle piece is flared outwardly, as indicated at 8, so that a rounded edge will be presented towards the animal's head.

The muzzle piece is provided with a plurality of jabbers 9 which preferably are made of clockspring steel and have their free ends looped back and riveted, as indicated at 10, with their extreme end portions provided with sharpened end points 11 directed inwardly towards the wearer's nose beyond the muzzle piece. The other end of the jabbers are bent and riveted to the muzzle piece, as indicated at 12, so that the jabbers are yieldingly urged outwardly away from the animal. Preferably the front portions of the loops are provided with small sharpened barbs 13 which extend forwardly and outwardly. These barbs may be struck from the edge portions of the jabbers. In the event that the wearer of the weaner is able to draw a teat between a pair of the jabbers, these barbs will prick the cow and cause the cow to force the wearer of the weaner away.

The outward movement and the lateral positioning of the jabbers is confined by a keeper 14 which preferably is bent around the path of each jabber and is riveted or welded to the muzzle piece, as indicated at 15. The keeper holds the jabbers in spaced relation with their points slightly outside of the plane of the muzzle piece but permits them to move inwardly when the spring jabber is pressed lightly. The keeper also makes the end of the muzzle piece slightly more rigid but does not prevent it from being bent by hand to a desired shape to fit a particular animal.

The weaner illustrated is provided with five jabbers but for small calves or heifers, three are usually sufficient. However, it will be understood that any desired number may be provided.

The foregoing detailed description has been given for clearness of understanding only, and no unnecessary limitations should be understood therefrom for some modifications will be obvious to those skilled in the art.

I claim:

1. An animal weaner comprising: a muzzle piece adapted to be saddled securely onto the nose of an animal; a plurality of depending spring jabbers each having one end portion looped back on itself and provided with sharpened end points directed inwardly towards the wearer's nose, and the other end portion bent and secured to said muzzle piece so that said points are yieldingly urged outwardly; and a keeper secured to the muzzle piece so as to confine the outward movement of said jabbers.

2. A device as specified in claim 1, in which the jabbers are formed of thin flat spring steel, and the loop in the spring is permanently closed against the main body of each spring.

3. A device as specified in claim 1, in which the jabbers are formed of thin flat spring steel, and a sharpened barb is struck outwardly from the edge of the front of the looped portion of each jabber.

4. A device as specified in claim 1, in which the keeper is bent around each jabber and is riveted to the muzzle piece on each side of each jabber so as to keep the jabbers in proper spaced relationship.

5. A device as specified in claim 1, in which the muzzle piece is made of thin sheet metal so as to be readily bendable by hand to fit the nose of an animal.

CLARENCE L. AUSTIN.